(12) United States Patent
Lin et al.

(10) Patent No.: US 10,803,334 B1
(45) Date of Patent: *Oct. 13, 2020

(54) DETECTION OF UNSAFE CABIN CONDITIONS IN AUTONOMOUS VEHICLES

(71) Applicant: Alpine Electronics of Silicon Valley, Inc., Santa Clara, CA (US)

(72) Inventors: Rocky Chau-Hsiung Lin, Cupertino, CA (US); Thomas Yamasaki, Anaheim Hills, CA (US); Koichiro Kanda, San Jose, CA (US)

(73) Assignee: Alpine Electronics of Silicon Valley, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/657,575

(22) Filed: Oct. 18, 2019

(51) Int. Cl.
| | |
|---|---|
| G06N 3/04 | (2006.01) |
| G06N 3/08 | (2006.01) |
| G06K 9/62 | (2006.01) |
| G08B 25/10 | (2006.01) |
| B60Q 9/00 | (2006.01) |
| G06K 9/00 | (2006.01) |
| H04W 4/44 | (2018.01) |
| B60R 22/48 | (2006.01) |

(52) U.S. Cl.
CPC ......... *G06K 9/00832* (2013.01); *B60Q 9/008* (2013.01); *B60R 22/48* (2013.01); *G06K 9/00335* (2013.01); *G06K 9/6256* (2013.01); *G06K 9/6267* (2013.01); *G06N 3/04* (2013.01); *G06N 3/08* (2013.01); *G08B 25/10* (2013.01); *H04W 4/44* (2018.02); *B60R 2022/4891* (2013.01)

(58) Field of Classification Search
None
See application file for complete search history.

(56) References Cited

U.S. PATENT DOCUMENTS

| | | |
|---|---|---|
| 8,370,030 B1 | 2/2013 | Gurin |
| 9,760,827 B1 | 9/2017 | Lin et al. |
| 9,965,720 B2 | 5/2018 | Lin et al. |
| 10,204,302 B2 | 2/2019 | Lin et al. |
| 10,210,451 B2 | 2/2019 | Lin et al. |
| 2010/0033333 A1 | 2/2010 | Victor et al. |
| 2012/0089299 A1 | 4/2012 | Breed |
| 2014/0335902 A1 | 11/2014 | Guba et al. |
| 2015/0179062 A1 | 6/2015 | Ralston et al. |

(Continued)

OTHER PUBLICATIONS

Ohn-Bar, et al., "On surveillance for safety critical events: In-vehicle video networks for predictive driver assistance systems", 2015, Computer Vision and Image Understanding, 134, pp. 130-140.

(Continued)

*Primary Examiner* — Idowu O Osifade
(74) *Attorney, Agent, or Firm* — Perkins Coie LLP

(57) ABSTRACT

Devices, systems and processes for the detection of unsafe cabin conditions that provides a safer passenger experience in autonomous vehicles are described. One example method for enhancing passenger safety includes capturing at least a set of images of one or more passengers in the vehicle, determining, based on the set of images, the occurrence of an unsafe activity in an interior of the vehicle, performing, using a neural network, a classification of the unsafe activity, and performing, based on the classification, one or more responsive actions.

14 Claims, 16 Drawing Sheets

(56) References Cited

U.S. PATENT DOCUMENTS

| | | |
|---|---|---|
| 2016/0001781 A1 | 1/2016 | Fung et al. |
| 2016/0034809 A1 | 2/2016 | Trenholm et al. |
| 2016/0205238 A1 | 7/2016 | Abramson et al. |
| 2016/0347310 A1 | 12/2016 | Moran et al. |
| 2017/0001650 A1 | 1/2017 | Park |
| 2017/0045890 A1 | 2/2017 | Gurin |
| 2017/0206440 A1 | 7/2017 | Schrier et al. |

OTHER PUBLICATIONS

Dong, et al., "Driver Inattention Monitoring System for Intelligent Vehicles: A Review", Jun. 2011, IEEE Transactions on Intelligent Transporation Systems, vol. 12, No. 2, pp. 596-614.

US 10,803,334 B1

DETECTION OF UNSAFE CABIN CONDITIONS IN AUTONOMOUS VEHICLES

TECHNICAL FIELD

This document relates to systems, devices and processes that enhance the passenger experience in non-, partially- and/or fully-autonomous vehicles.

BACKGROUND

Vehicles are currently equipped with a variety of input and output devices that are leading to completely self-driving cars, but now need to be augmented or reconfigured to provide safe and enjoyable experiences inside the vehicle for the passengers. Detecting unsafe cabin conditions is integral to providing an enhanced and safe user experience.

SUMMARY

Disclosed are devices, systems and methods for detecting unsafe cabin conditions that ensure a safer passenger experience in autonomous vehicles. This may be achieved by processing images captured by an internal camera system using a neural network that is configured to classify the unsafe activity, and subsequently take one or more responsive actions.

One exemplary method for enhancing passenger safety in a vehicle includes capturing at least a set of images of one or more passengers in the vehicle, determining, based on the set of images, the occurrence of an unsafe activity in an interior of the vehicle, performing, using a neural network, a classification of the unsafe activity, and performing, based on the classification, one or more responsive actions.

The above and other aspects and features of the disclosed technology are described in greater detail in the drawings, the description and the claims.

DETAILED DESCRIPTION

Figure 1A:
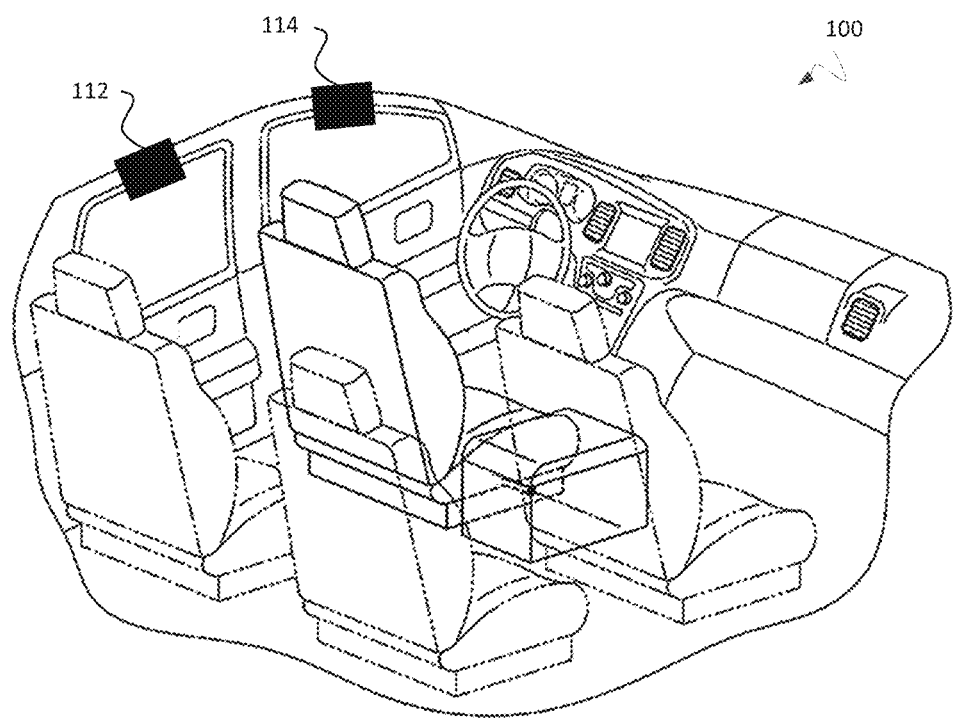
FIG. 1A shows an example of the internal camera system, according to embodiments of the disclosed technology.

The transportation industry has been undergoing considerable changes in the way technology is used to control the operation of the vehicles. As exemplified in the automotive passenger vehicle, there has been a general advancement towards shifting more of the operational and navigational decision making away from the human driving and into on-board computing power. This is exemplified in the extreme by the numerous under-development autonomous vehicles. Current implementations are in intermediate stages, such as the partially-autonomous operation in some vehicles (e.g., autonomous acceleration and navigation, but with the requirement of a present and attentive driver), the safety-protecting operation of some vehicles (e.g., maintaining a safe following distance, staying in the same lane and automatic braking), the safety-protecting warnings of some vehicles (e.g., blind-spot indicators in side-view mirrors and proximity sensors), as well as ease-of-use operations (e.g., autonomous parallel parking and the summon feature).

The move towards automatic operation of vehicles has also resulted in a change in how users interact with the vehicles themselves. For example, in fully autonomous vehicles, the "driver" may be free to conduct any number of activities not typically possible (e.g., reading a book, watching a movie, looking at a passenger with whom he is engaged in conversation).

Embodiments of the disclosed technology are based on the recognition that the move towards automatic operation of vehicles may be accompanied by passengers engaging in activities that may be unsafe in a moving, or soon to be moving, vehicle. Passenger safety is paramount in vehicular operation, and more so when the vehicle is being operated automatically.

But this opportunity also presents technological and safety challenges.

First, autonomous vehicles presently being designed are generally focused on passenger safety based on sensors that are placed on the outside of the vehicle (e.g., long-range cameras, LiDAR sensors) and ensuring that the vehicle does not collide with any obstacles, including other vehicles, objects, pedestrians and/or bicyclists. However, ensuring the safety of passengers inside the cabin due to their own interactions and activities has not been subject to the same level of research and development.

Second, passenger interaction and activities inside the cabin of a vehicle that is fully autonomous may be extremely hazardous in vehicles that are not autonomous or only partially autonomous. And it is unlikely that the entire automotive industry will undergo a single, sudden change over from non-autonomous to fully-autonomous vehicles. This poses another safety problem as users themselves alternate between different vehicles with different levels of autonomous operation (e.g., the person's fully autonomous car, the person's spouse's partially autonomous car, a non-autonomous rental car, a friend's non-autonomous car, etc.). Namely, a user that has adopted the social behaviors of greater interaction with external environments that are possible and desirable in an autonomous vehicle may not abandon those same behaviors when driving a non-autonomous vehicle, thereby potentially endangering himself, other passengers in the vehicle, pedestrians, and passengers in other vehicles. It should not be underestimated the way in which minor changes in vehicle environments can cause significant driver confusion. There have been numerous reports of crashes and deaths due to "unintended acceleration" when a driver operated an unfamiliar vehicle, with the ultimate cause being that the driver was unaccustomed to the position of the pedals and inadvertently engaged the accelerator instead of the brake. Thus, minor variations in vehicle environments have the possibility to introduce significant safety risks.

And such variations are likely to increase in the future. Even as autonomous automobiles become commercially viable, it is unlikely that the entire automotive market will make a single, sudden shift to autonomous vehicles. Due to considerations of price, user preference, and other factors, it is likely that the new car market in the coming years will consist of a mixture of different levels of non-, partial-, and fully-autonomous vehicles. Adding to that the existing heterogenous mix of vehicles already on the road, it is likely that drivers in the future will encounter many different types of vehicle operations. And for the reasons described above, this has the potential to introduce significant safety concerns.

Thus, for both technological and safety reasons, the inventors recognize the need for advancements in vehicle technology relating to providing systems and methods for detecting unsafe cabin conditions in non-, partial-, and fully-autonomous vehicles.

Figure 1B:
FIGS. 1B, 1C and 1D show example images from an internal camera, according to an embodiment of the disclosed technology.
Figure 1C:
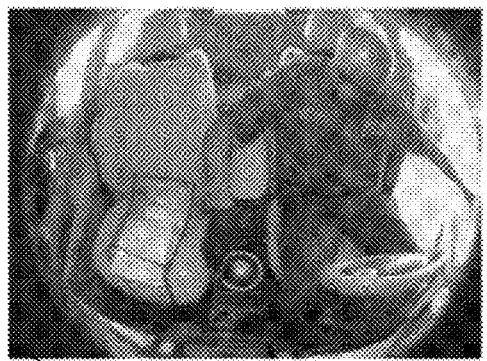
Figure 1D:
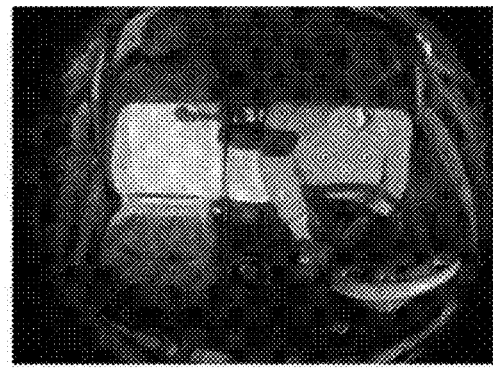

FIG. 1A shows an example of the internal camera system, according to embodiments of the disclosed technology. In some embodiments, the internal camera system 100 may include a single camera for each seating row in the vehicle (e.g., cameras 112 and 114 for the back and front rows, respectively). In other embodiments, the internal camera system 100 may include a first camera that is adjacent to the rear-view mirror of the vehicle and a second camera that is adjacent to the main cabin light. For example, the first camera adjacent to the rear-view mirror may be a fisheye lens, and example images from this type of internal camera system are shown in FIGS. 1B, 1C and 1D.

Figure 2A:
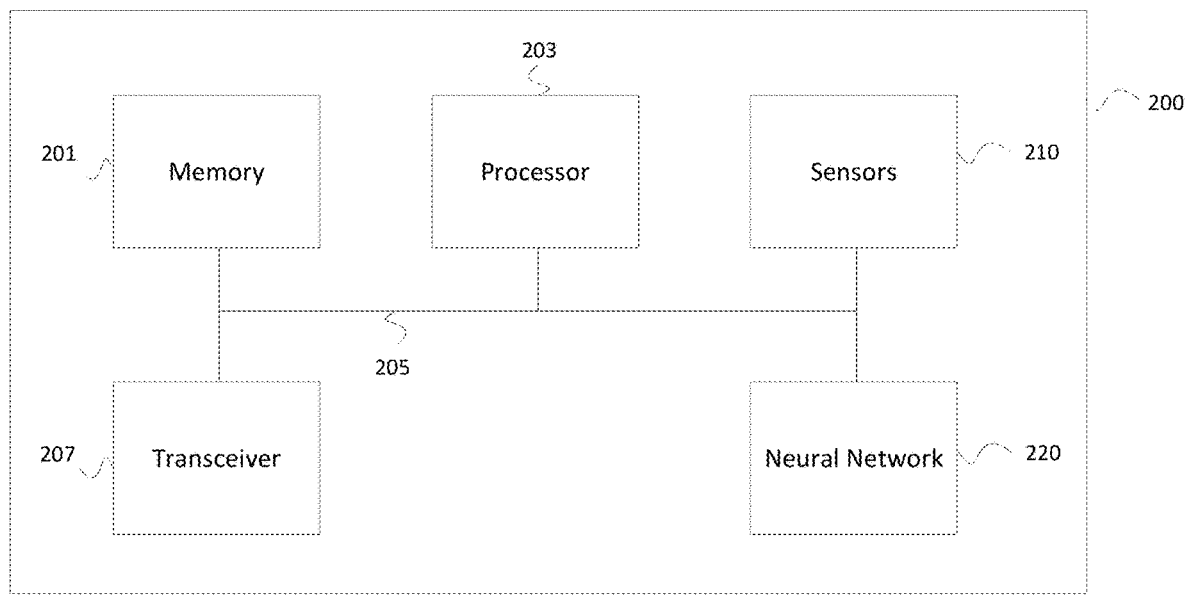
FIGS. 2A and 2B show block diagrams of exemplary systems that enables the detection of unsafe cabin conditions, according to embodiments of the disclosed technology.

FIG. 2A shows a block diagram of an exemplary system that enables the detection of unsafe cabin conditions, according to embodiments of the disclosed technology. The system 200 includes a memory 201, a processor 203, a coupling 205, a transceiver 207, a set of sensors 210, and a neural network 220.

The memory 201, processor 203, transceiver 207, set of sensors 210 and neural network 220 may be coupled together by coupling 205 (e.g., a wired communication bus). In some embodiments, only a subset of the memory 201, processor 203, transceiver 207, set of sensors 210 and neural network 220 may be coupled together by coupling 205.

The transceiver 207 may be configured to communicate with other devices co-located in the vehicle and with remote devices. For example, one or more of the internal cameras (e.g., 112 and 114 in FIG. 1) may be wireless cameras that communicate with the processor 203 and neural network 220 via the transceiver 207. As another example, the transceiver may be used to notify a central ride monitoring system and/or a law enforcement authority of the unsafe cabin conditions if and when such a notification is warranted.

In some embodiments, the transceiver 207 may support cellular communication (e.g., CDMA2000, GSM, 4G LTE) or an IEEE 802.11 Wi-Fi link. In some embodiments, the transceiver 207 may support a dedicated cellular link (e.g., a link to a cellular radio access network provided specifically for the system 200). In some embodiments, the transceiver 207 may support a shared cellular link (e.g., a link to a cellular radio access network shared with other services in the automobile environment). Other forms of communications links and communications transceivers may be used in various embodiments of the present disclosure.

The memory 201 may be configured to temporarily store information pertaining to image information received by the transceiver 207 or being used by the neural network 220.

The processor 203 may be configured to process information stored by the memory 201 and/or received by the transceiver 207. The processor 908 may be configured to perform various data processing tasks (e.g., image compression, data serialization, neural network processing, implementing artificial intelligence algorithms, etc.).

Figure 2B:
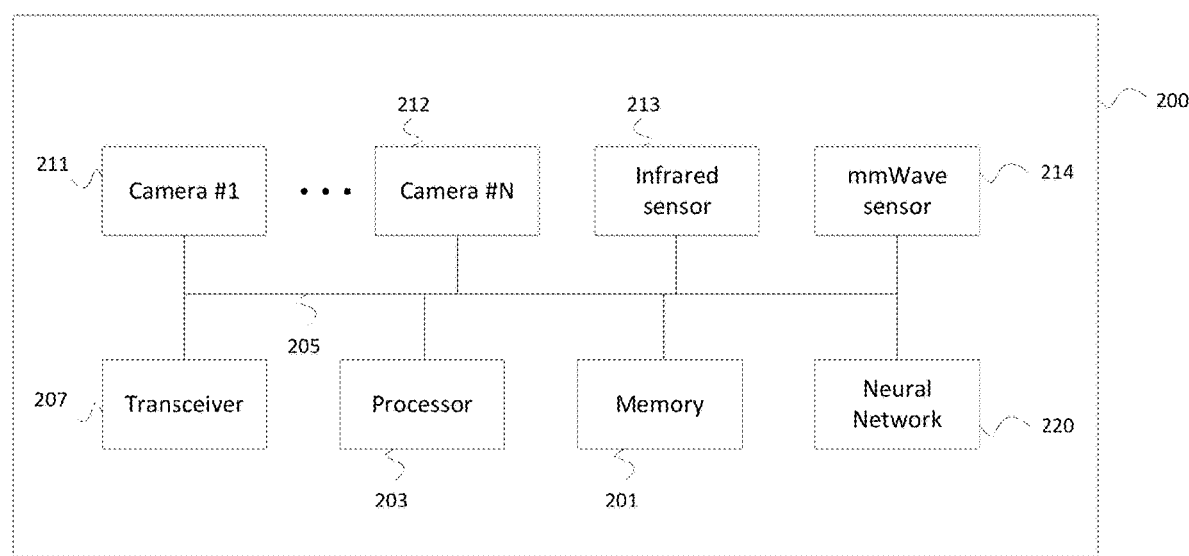

FIG. 2B shows a block diagram of another exemplary system that enables the detection of unsafe cabin conditions, according to embodiments of the disclosed technology. The system 200 in FIG. 2B includes some features and/or (sub-)components that are similar to those shown in FIG. 2A, and described above. At least some of these features and/or (sub-)components may not be separately described in this section.

In some embodiments, the set of sensors (210 in FIG. 2A) may include one or more cameras (e.g., camera #1 211, . . . , camera #N 212), an infrared sensor 213 and a millimeter wave (mmWave) sensor 214. In other embodiments, the set of sensors may include only a subset of the one or more cameras (e.g., camera #1 211, . . . , camera #N 212), an infrared sensor 213 and a millimeter wave (mmWave) sensor 214.

Figure 3:
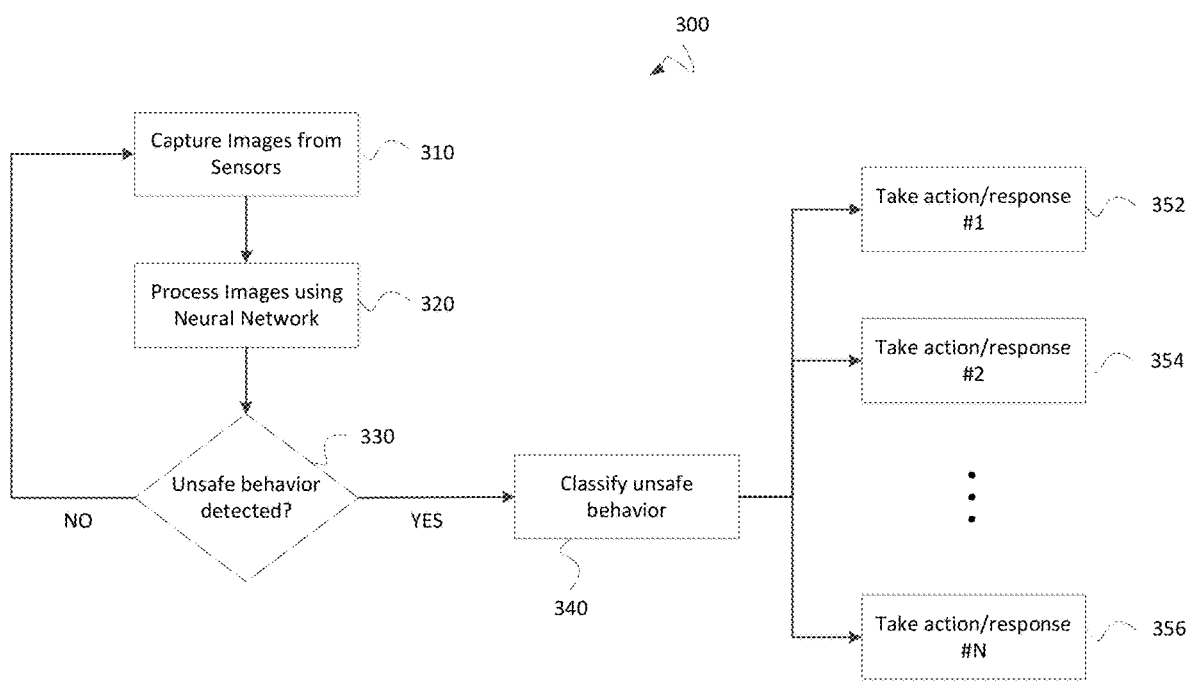
FIG. 3 is a flowchart of a process for employing a neural network to classify unsafe cabin conditions, according to embodiments of the disclosed technology.

FIG. 3 is a flowchart of a process 300 for employing a neural network to classify unsafe cabin conditions, according to embodiments of the disclosed technology.

At block 310, images are captured by sensors. The image data may be captured by any of a variety of sensors, such as described with respect to sensors elsewhere in the present disclosure (e.g., sensors 112, 114, 210, 211, 212, 213 and 214).

At block 320, the images are processed by a neural network (e.g., 220). For example, the neural network may include one or more convolutional neural networks (CNNs) and/or recurrent neural networks (RNNs) that may be configured in different arrangements. In another example, the RNNs may include one or more long short-term memory (LSTM) units, which may be used to implement deep learning algorithms.

At block 330, a determination is made as to whether an unsafe behavior is detected in the captured images. If an unsafe behavior is not detected, the process returns to block 310 wherein the next subsequent set of images are captured by the sensors. If an unsafe behavior is detected, the process continues to block 340.

At block 340, the unsafe behavior is classified by the neural network. In some embodiments, the processing order of blocks 330 and 340 can be interchanged. In other embodiments, the functionality described in blocks 330 and 340 may be combined. For example, one or more CNNs may be implemented in parallel to process different aspects of the image data (e.g., each CNN may be used to identify a different type of unsafe activity). The outputs of the CNN may be input to an RNN, which can then fuse the information together to classify (or identify) the unsafe behavior.

At blocks 352, 354 and 356, one or more responsive actions (actions #1, #2 and #N, respectively) can be taken in response to the classification of the unsafe behavior. For example, the passengers in the vehicle may be warned about the unsafe conditions. In another example, a central ride monitoring system or a law enforcement authority may be notified. In yet another example, the unsafe behavior may be documented.

Figure 4A:
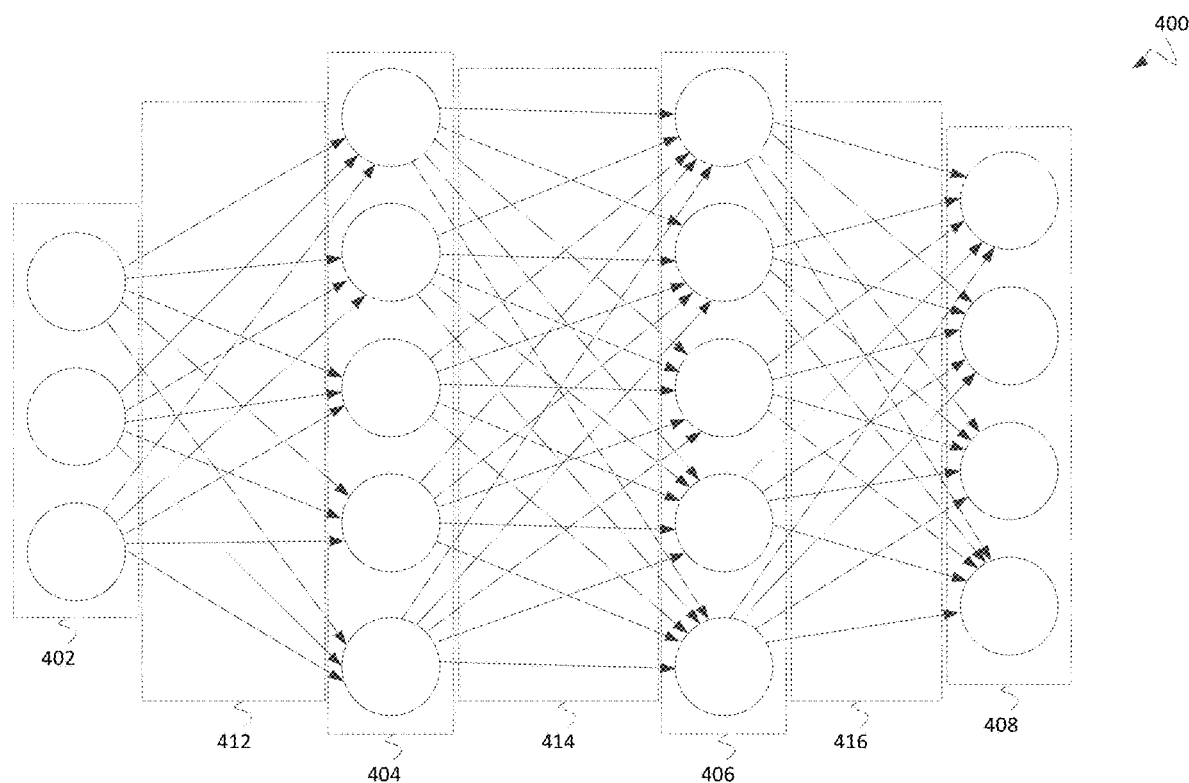
FIGS. 4A, 4B and 4C are diagrams of exemplary neural network structures, according to embodiments of the disclosed technology.
Figure 4B:
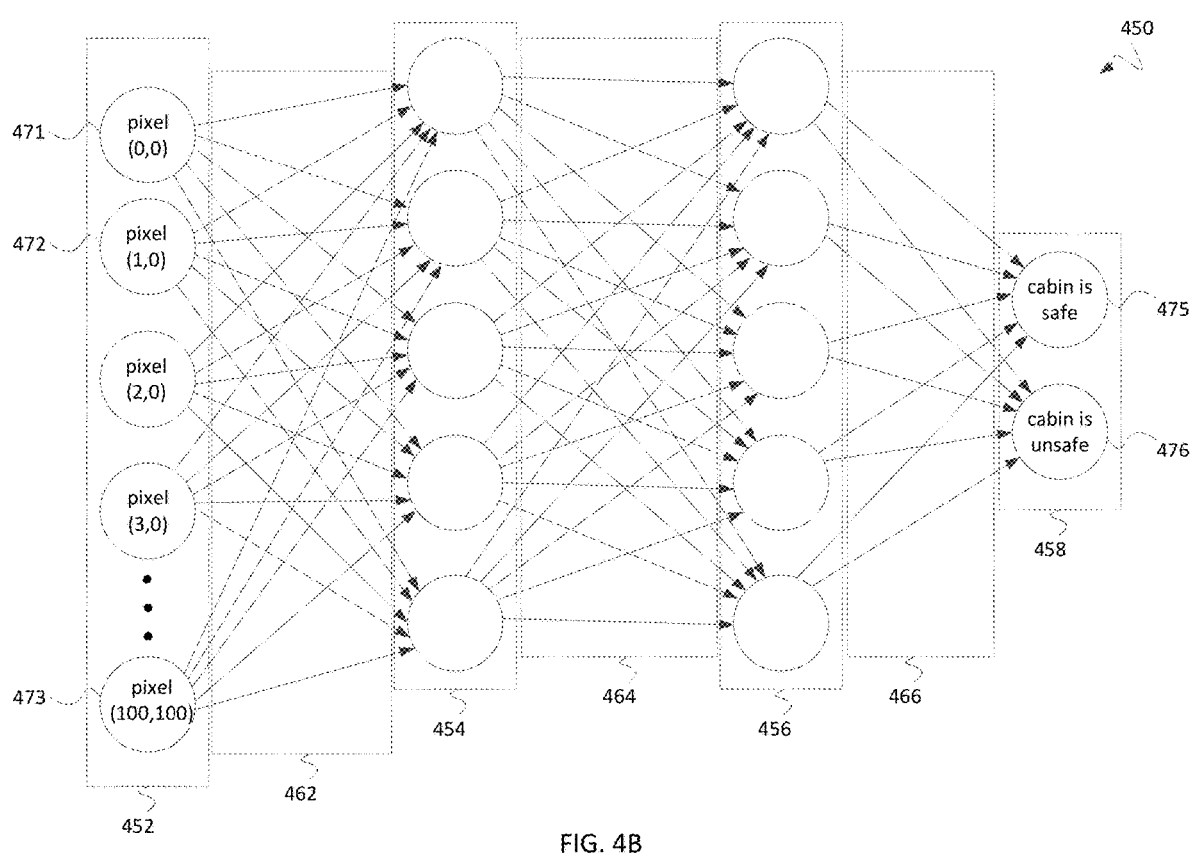
Figure 4C:
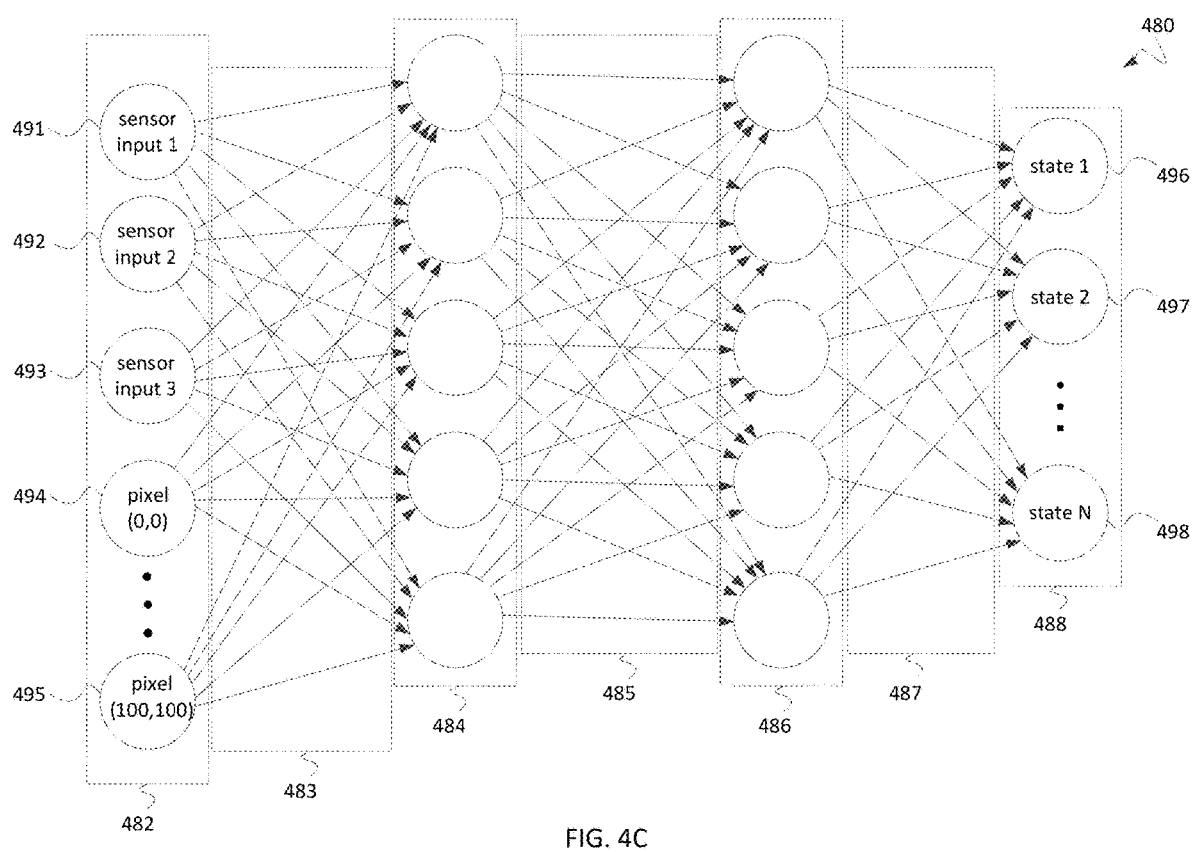

FIGS. 4A, 4B and 4C are diagrams of exemplary neural network structures, according to embodiments of the disclosed technology.

FIG. 4A is a diagram of an exemplary neural network structure 400 according to some embodiments of the present disclosure. Neural network structure 400 includes layers 402, 404, 406, and 408. Neural network structure 400 includes connections 412, 414, and 416.

Neural network structure 400 receives input values at input layer 402. Neural network structure 400 then propagates those values through connections 412 to layer 404. Each of the connections of connections 412 may include a numerical weighting value (e.g., a value between −1 and 1) that is used to modify the original value (e.g., propagated value=original value*weight). The nodes of layer 404 receive these propagated values as input. Each node of layer 404 may include a function that combine the received input values (e.g., summing all received inputs). Each node of nodes 404 may further contain one or more activation functions that determines when a value will be output on a connection of connections 414 (e.g., output +1 if the combined value of the inputs is >0 and output −1 if the combined value of the inputs is <0, and output 0 if the combined value of the inputs is =0). The output values of the nodes of layer 404 may then be propagated by connections 414. Each connection of connections 414 may have a weight value as described with respect to connections 412. The nodes of layer 406 may combine the received input values and use one or more activation functions as described with respect to the nodes of layer 404. The output values of the nodes of layer 406 may then be propagated by connections 416. Each connection of connections 416 may have a weight value as described with respect to connections 412. The nodes of output layer 408 may combine the received input values from the connections 416. Each node of output layer 408 may correspond to a predefined category for the input values. The combined input values for each node of the output layer 408 may determine a category determined for the input (e.g., the category for the output node that has the largest combined input values). In this way, neural network structure 400 may be used to determine a category for some input.

The neural network structure 400 may be configured to accurately determine a category for some input through a process called training. For training, numerous inputs are labeled with their correct categories by a user or some other actor. The weights for connections 412, 414, and 416 may be provided with default and/or random values to start. The inputs are then provided to the neural network structure 400 through input layer 402, and the determined categories for the inputs (e.g., based on highest combined input values at the nodes of output layer 408) are observed and compared to the correct categories as previously labeled. The weights for connections 412, 414, and 416 are then repeatedly modified until the neural network structure 400 correctly determines the correct categories for all of the inputs, or at least for an acceptable portion of all of the inputs.

When a new input is received without a correct category previously determined, that input can be provided to the neural network structure 400 to determine the most likely category for that input.

FIG. 4B is a diagram of an exemplary neural network structure 450 according to some embodiments of the present disclosure. In some embodiments, neural network structure 450 may be used to categorize the behavior in a cabin of a vehicle as "safe" or "unsafe" based on images of the inside of the vehicle. Neural network structure 450 includes layers 452, 454, 456, and 458, which may be provided as described with respect to layers 402, 404, 406, and 408, respectively. Neural network structure 450 includes connections 462, 464, and 466, which may be provided as described with respect to connections 412, 414, and 416, respectively.

The input to neural network structure 450 may be an image of the driver of the automobile. The image of the driver (e.g., images 102, 104, 106) may be captured using a camera (e.g., cameras 114, 116, 211, 212). The image of the driver may be converted from its raw captured format (e.g., 8-megapixel color photo) to a compressed format (e.g., 100 pixel×100 pixel grayscale image). A numerical value for each pixel (e.g., integer grayscale value between 0 ("black") and 255 ("white")) may be inputted to a separate node of the input layer 452. For example, input node 471 may receive the numerical pixel value for the pixel in the topmost and leftmost pixel. Input node 472 may receive the numerical pixel value for the pixel in the topmost and second-to-leftmost pixel. The numerical pixel values may be assigned to input nodes of layer 452 continuing in this left-to-right fashion across the topmost row of pixels, then continuing with the subsequent rows, until the numerical pixel value for the bottommost and rightmost pixel is assigned to input node 473.

The output nodes of layer 458 of the neural network structure 450 may include output node 475 and output node 476. Output node 475 may correspond to a "cabin is safe" category, while output node 476 may correspond to a "cabin is unsafe" category.

In order to train the neural network structure 450, images of one or more passengers inside the cabin of the vehicle may be captured, compressed (e.g., as described previously), and labeled. The weights for each of the connections of connections 462, 464, and 466 may be randomly set to a value between −1 and +1. Each node of layers 454 and 456 may be configured to use a combination function (e.g., summation) and an activation function (e.g., sign of the combined input values) as described previously or otherwise known in the art. The compressed images may then be input to the neural network structure 450 (e.g., using the pixel numerical values as inputs to the input layer 452). The input values may be propagated through the neural network structure 450 as described with respect to the neural network structure 400. The category for each input image may be determined as "cabin is safe" if output node 475 has a combined input values greater than the combined input values of output node 476. The category for each input image may be determined as "cabin is unsafe" if output node 475 has a combined input values less than or equal to the combined input values of output node 476. These determined categories can be compared to the correct categories labeled previously. Using any optimization algorithm known in the art, the weights of the connections 462, 464, and 466 can be repeatedly modified until the neural network structure 450 accurately determines the categories for all or at least an acceptable portion of the input images.

The neural network structure 450, thus trained, may then be used to determine the interior state of the vehicle (i.e., "cabin is safe" or "cabin is unsafe") at points in the future. This may be accomplished by providing the neural network (e.g., 220 in FIGS. 2A and 2B) structure 450 at a computing device in the automobile. Then, when the sensor (e.g., sensors 112, 114, 210, 211, 212, 213 and 214) captures an image (or other data) of the cabin, that image can be compressed and input into the trained neural network structure 450. The category determined by the trained neural network structure 450 (i.e., "cabin is safe" or "cabin is unsafe") can then be used as the most likely state of the driver at the moment the driver image was captured.

The foregoing disclosure of neural network structures 400 and 450 was intended to be exemplary, and neural network structures may be provided in different forms in various embodiments. For example, while neural network structures 400 and 450 include four layers of nodes, more or fewer layers of nodes may be used in some embodiments. As another example, more output nodes in the output layer may be used in some embodiments (e.g., nodes representing different unsafe conditions like "object protruding," "incapacitated passenger," "unrestrained child," etc.). As another example, while neural network structures 400 and 450 include connections from every node in one layer to every node in the next layer ("fully connected"), fewer connections may be used in some embodiments. As another example, the number of nodes per layer (e.g., more or less than five nodes in layer 454) may be different in some embodiments. As another example, while neural network structures 400 and 450 were described as using weight values for each connection and combination and activation functions for each node, other configurations including more or fewer elements for the neural network structure may be used in some embodiments. As another example, compression of the image captured by the in-automobile sensor may not be used in some embodiments. As another example, conversion to grayscale of the image captured by the in-automobile sensor may not be used in some embodiments. Other modifications of neural network structures 400 and 450 in accordance with the present disclosure are possible in various embodiments.

FIG. 4C is a diagram of an exemplary neural network structure 480 according to some embodiments of the present disclosure. In some embodiments, neural network structure 480 may be used to classify the specific unsafe behavior that may be occurring inside the cabin of the vehicle based on the captured images. Neural network structure 480 includes layers 482, 484, 486, and 488, which may be provided as described with respect to layers 452, 454, 456, and 458, respectively. Neural network structure 480 includes connections 481, 483, and 485, which may be provided as described with respect to connections 462, 464, and 466, respectively.

The input to neural network structure 480 may be one or more images of the cabin interior in addition to other sensor data (e.g., mmWave sensor data, infrared sensor data, acoustic sensor data). The images may be provided as input to the neural network structure 480 using input node 494, input node 495, and other input nodes of input layer 482, as described for neural network structure 450 and input layer 452 of FIG. 4B. Additional data may be provided to input nodes 491, 492, and 493. For example, mmWave sensor data may be input into input node 491. Infrared data may be input into input node 492. A user biometric value (e.g., heartrate of the driver) may be input into input node 493. Other image and non-image sensor inputs may be used in various embodiments.

The output nodes of layer 488 of the neural network structure 480 may include output node 496, output node 497 and output node 498. Output node 496 may correspond to "state 1" (e.g., there is an unrestrained child in the cabin), output node 497 may correspond to "state 2" (e.g., there is a dangerous object in the cabin), and the output node 497 may correspond to "state N" (e.g., the cabin has been vandalized).

The neural network structure 480 may be trained as described with respect to neural network structure 450. With neural network structure 480, though, a label applied to input data may be applied to a tuple of input data: <image, sensor data 1, sensor data 2, sensor data 3>. That is, a label provided for the input data may not be specific to just an image provided as input. Rather, the label may be provided as applicable to the entire situation in the automobile as described by the image, the sensor data 1, the sensor data 2, and the sensor data 3. In some embodiments, the image, sensor data 1, and sensor data 2, and sensor data 3 may all be captured in the same automobile at approximately the same time.

The neural network structure 480, thus trained, may then be used to determine the state of the cabin (i.e., "cabin is safe" or "cabin is unsafe") at points in the future. This may be accomplished by providing the neural network structure 480 at a computing device in the automobile. Then, when the sensor (e.g., sensors 112, 114, 210, 211, 212, 213 and 214) of the automobile captures sensor data, that image and sensor data captured by other sensors can be input into the trained neural network structure 480. The category determined by the trained neural network structure 480 (i.e., "cabin is safe" or "cabin is unsafe") can then be used as the most likely state of the behavior in the cabin at the moment the image and sensor data was captured.

Figure 5:
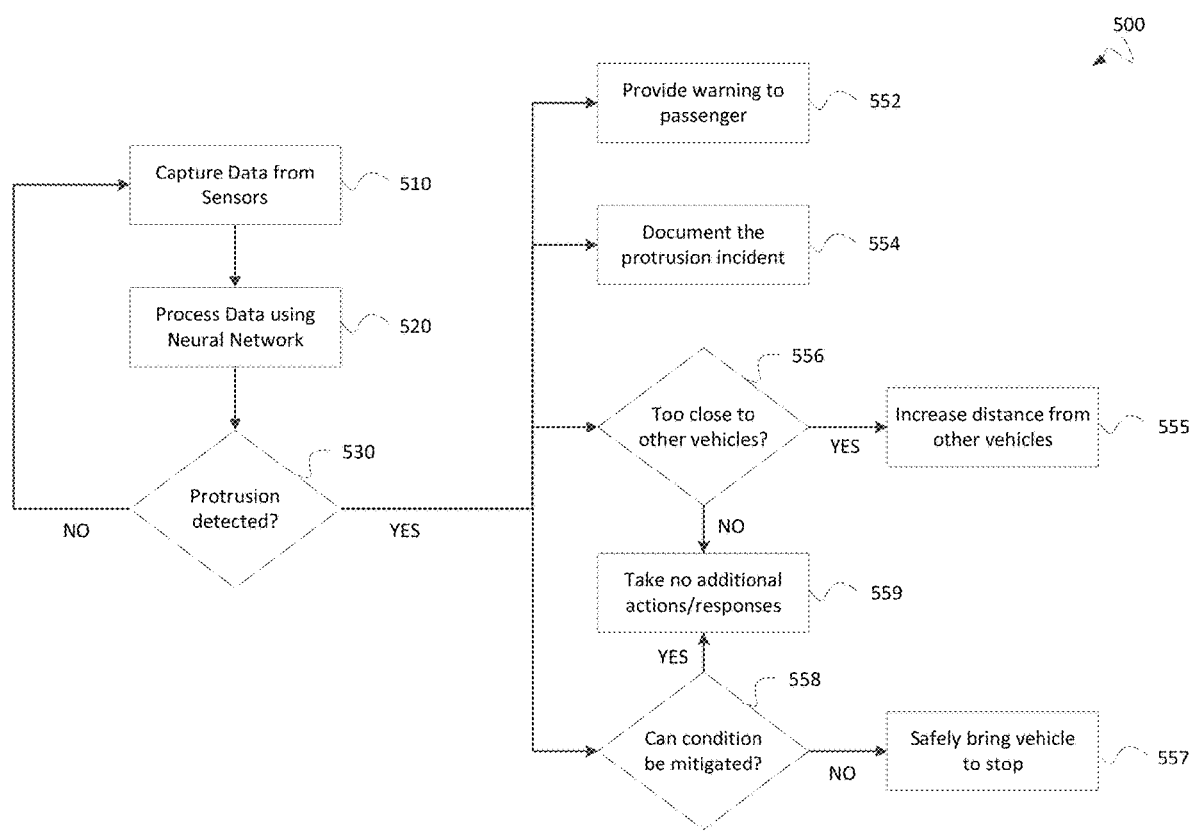
FIG. 5 is a flowchart of an example process for detecting an unsafe cabin condition, in accordance with embodiments of the disclosed technology.

FIG. 5 is a flowchart of an example process 500 for detecting an unsafe cabin condition, in accordance with embodiments of the disclosed technology.

At block 510, sensor data is captured. In some embodiments, the sensor data may include images, and may further include video data, acoustic data and/or environmental data (e.g. temperature or humidity). For example, the sensors used to capture the data may include one or more cameras, a mmWave sensor or an infrared sensor, as described with respect to sensors elsewhere in the present disclosure (e.g., sensors 112, 114, 210, 211, 212, 213 and 214).

At block 520, the sensor data is processed by a neural network (e.g., 220). For example, the neural network may include one or more convolutional neural networks (CNNs) and/or recurrent neural networks (RNNs) that may be configured in different arrangements. In another example, the RNNs may include one or more long short-term memory (LSTM) units, which may be used to implement deep learning algorithms. In yet another example, the each of the one or more CNNs may be used to process data from a different type of sensor.

At block 530, a determination is made as to whether a protrusion is detected. For example, the determination may encompass an object or an appendage of one of the passengers protruding through a window or a door of the vehicle. For example, a passenger may be sticking their hands and a cellphone out of the window in order to take a picture or video of the external environment. If a protrusion is not detected, the process returns to block 510 wherein the next subsequent set of images are captured by the sensors. If a protrusion is detected, the process continues to performing one or more responsive actions.

At block 552, the one or more responsive actions include providing a warning to the passengers. In some embodiments, the warning may be provided to a specific passenger who is responsible for the protrusion via that passenger's cellphone.

In some embodiments, the warning may be displayed on a common display in the vehicle that is visible to all the passengers.

At block 554, the one or more responsive actions include documenting the protrusion incident. In some embodiments, the unsafe behavior may be documented on-board the vehicle (e.g., using memory 201). In other embodiments, the unsafe behavior may be documented off-site using the available communication unit (e.g., transceiver 207).

At block 556, the one or more responsive actions includes making a determination as to whether the vehicle from which an object or appendage is being protruded is too close to another vehicle. If it is determined that the vehicle is too close to other vehicle, the distance between the vehicle and other proximate vehicles is increased (at block 555), preferably by slowing down or decelerating. If it is determined that no other vehicles are in the vicinity, no additional actions or responses are taken (at block 559).

At block 558, the one or more responsive actions includes making a determination as to whether the unsafe behavior can be mitigated. If it is determined that the unsafe behavior can be mitigated (e.g., the passenger pulls back their camera or cellphone into the interior of the cabin, and optionally, closes the window), no additional actions or responses are taken (at block 559). However, if it is determined that the unsafe behavior cannot be mitigated (e.g., a piece of sports equipment has fallen through an open window, and cannot be safely retrieved into the vehicle), the process attempts to safely bring the vehicle to a stop (at block 557).

Figure 6:
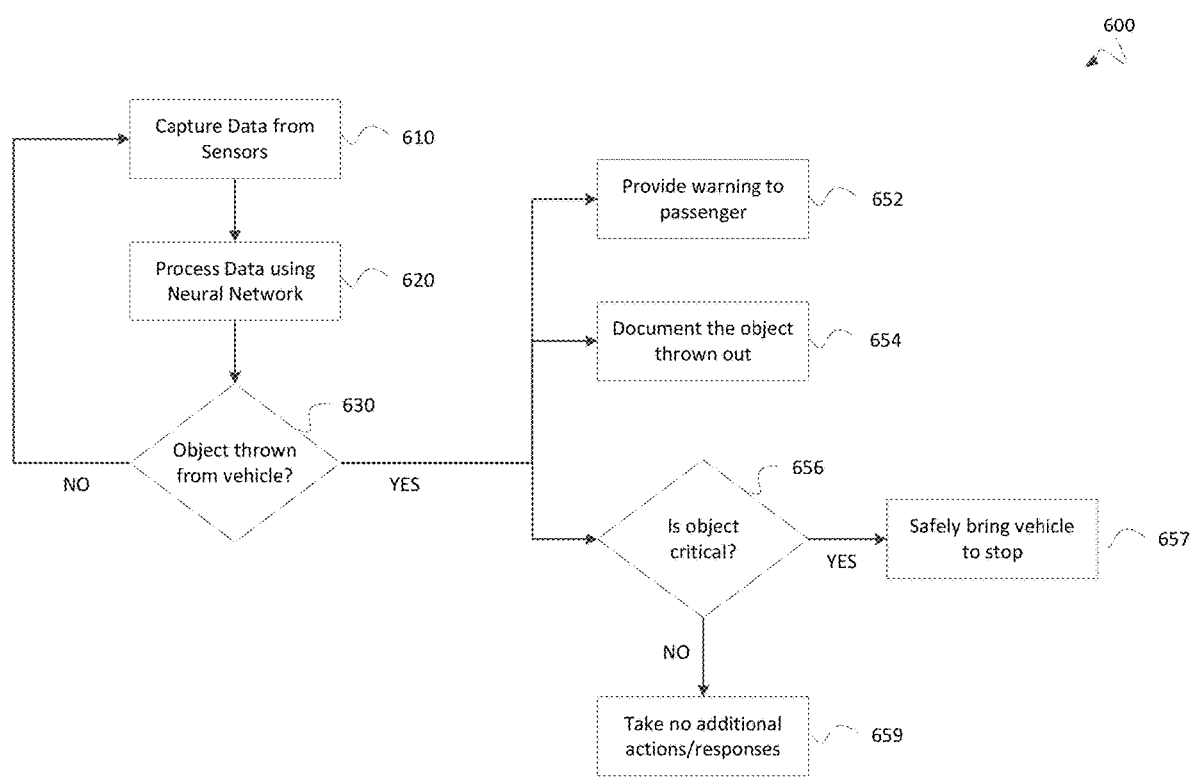
FIG. 6 is a flowchart of another example process for detecting an unsafe cabin condition, in accordance with embodiments of the disclosed technology.

FIG. 6 is a flowchart 600 of another example process for detecting an unsafe cabin condition, in accordance with embodiments of the disclosed technology.

At block 610, sensor data is captured. In some embodiments, the sensor data may include images, and may further include video data, acoustic data and/or environmental data (e.g. temperature or humidity). For example, the sensors used to capture the data may include one or more cameras, a mmWave sensor or an infrared sensor, as described with respect to sensors elsewhere in the present disclosure (e.g., sensors 112, 114, 210, 211, 212, 213 and 214).

At block 620, the sensor data is processed by a neural network (e.g., 220). For example, the neural network may include one or more convolutional neural networks (CNNs) and/or recurrent neural networks (RNNs) that may be configured in different arrangements. In another example, the RNNs may include one or more long short-term memory (LSTM) units, which may be used to implement deep learning algorithms. In yet another example, the each of the one or more CNNs may be used to process data from a different type of sensor.

At block 630, a determination is made as to whether an object was thrown out (or fell out) of the vehicle. If it is detected that an object was not thrown out, the process returns to block 610 wherein the next subsequent set of images are captured by the sensors. If it was detected that an object was thrown out, the process continues to performing one or more responsive actions.

At block 652, the one or more responsive actions include providing a warning to the passengers. In some embodiments, the warning may be provided to a specific passenger who is responsible for throwing the object out via that passenger's cellphone.

In some embodiments, the warning may be displayed on a common display in the vehicle that is visible to all the passengers.

At block 654, the one or more responsive actions include documenting the object that was thrown out. In some embodiments, the unsafe behavior may be documented on-board the vehicle (e.g., using memory 201). In other embodiments, the unsafe behavior may be documented off-site using the available communication unit (e.g., transceiver 207).

At block 656, the one or more responsive actions includes making a determination as to whether the object that was thrown or fell out was critical. If it determined that the object that was thrown out or that fell out was critical (e.g., a child slipped out as the vehicle started to drive away), the process attempts to safely bring the vehicle to a stop (at block 657). If it is determined that the object is not critical, no additional actions or responses are taken (at block 659).

Figure 7:
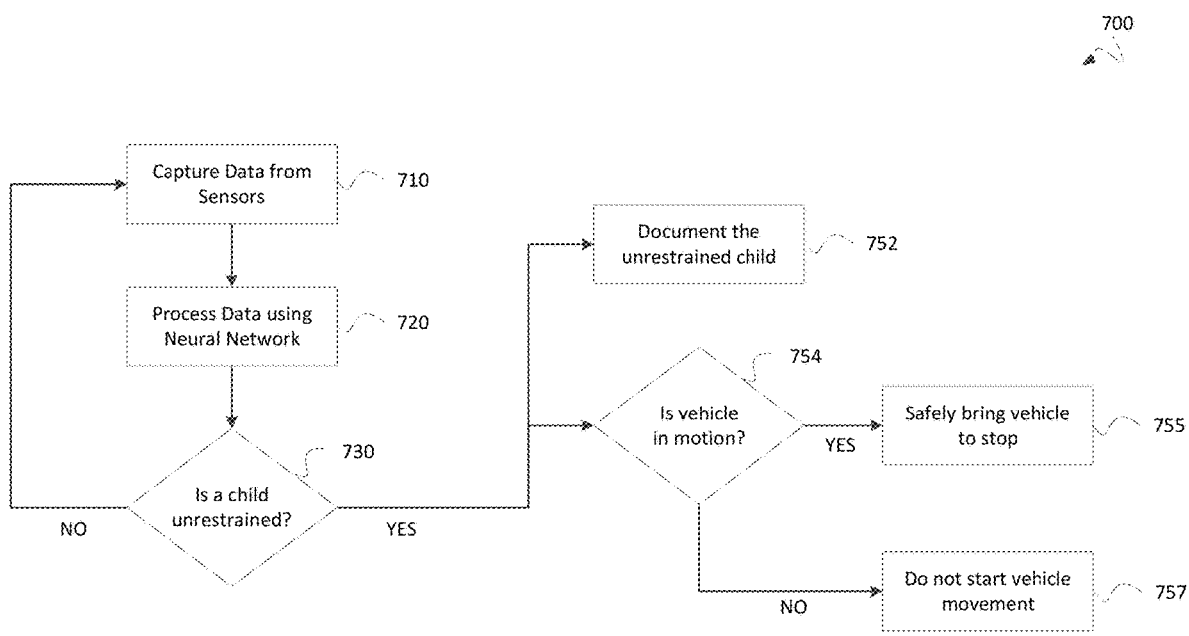
FIG. 7 is a flowchart of yet another example process for detecting an unsafe cabin condition, in accordance with embodiments of the disclosed technology.

FIG. 7 is a flowchart of yet another example process 700 for detecting an unsafe cabin condition, in accordance with embodiments of the disclosed technology.

At block 710, sensor data is captured. In some embodiments, the sensor data may include images, and may further include video data, acoustic data and/or environmental data (e.g. temperature or humidity). For example, the sensors used to capture the data may include one or more cameras, a mmWave sensor or an infrared sensor, as described with respect to sensors elsewhere in the present disclosure (e.g., sensors 112, 114, 210, 211, 212, 213 and 214).

At block 720, the sensor data is processed by a neural network (e.g., 220). For example, the neural network may include one or more convolutional neural networks (CNNs) and/or recurrent neural networks (RNNs) that may be configured in different arrangements. In another example, the RNNs may include one or more long short-term memory (LSTM) units, which may be used to implement deep learning algorithms. In yet another example, the each of the one or more CNNs may be used to process data from a different type of sensor.

At block 730, a determination is made as to whether there is an unrestrained child in the cabin. For example, the determination may encompass a toddler not being in a car-seat or an older child not wearing a seatbelt. If an unrestrained child is not detected, the process returns to block 710 wherein the next subsequent set of images are captured by the sensors. If an unrestrained child is detected, the process continues to performing one or more responsive actions.

At block 752, the one or more responsive actions include documenting that an unrestrained child was in the cabin. In some embodiments, the unsafe behavior may be documented on-board the vehicle (e.g., using memory 201). In other embodiments, the unsafe behavior may be documented off-site using the available communication unit (e.g., transceiver 207).

At block 754, the one or more responsive actions includes making a determination as to whether the vehicle is in motion or not. If it is determined that the vehicle is in motion, the process attempts to safely bring the vehicle to a stop (at block 755). If it is determined that the vehicle is not in motion, the process ensures that the vehicle does not start (at block 757) until the child is properly restrained.

Figure 8:
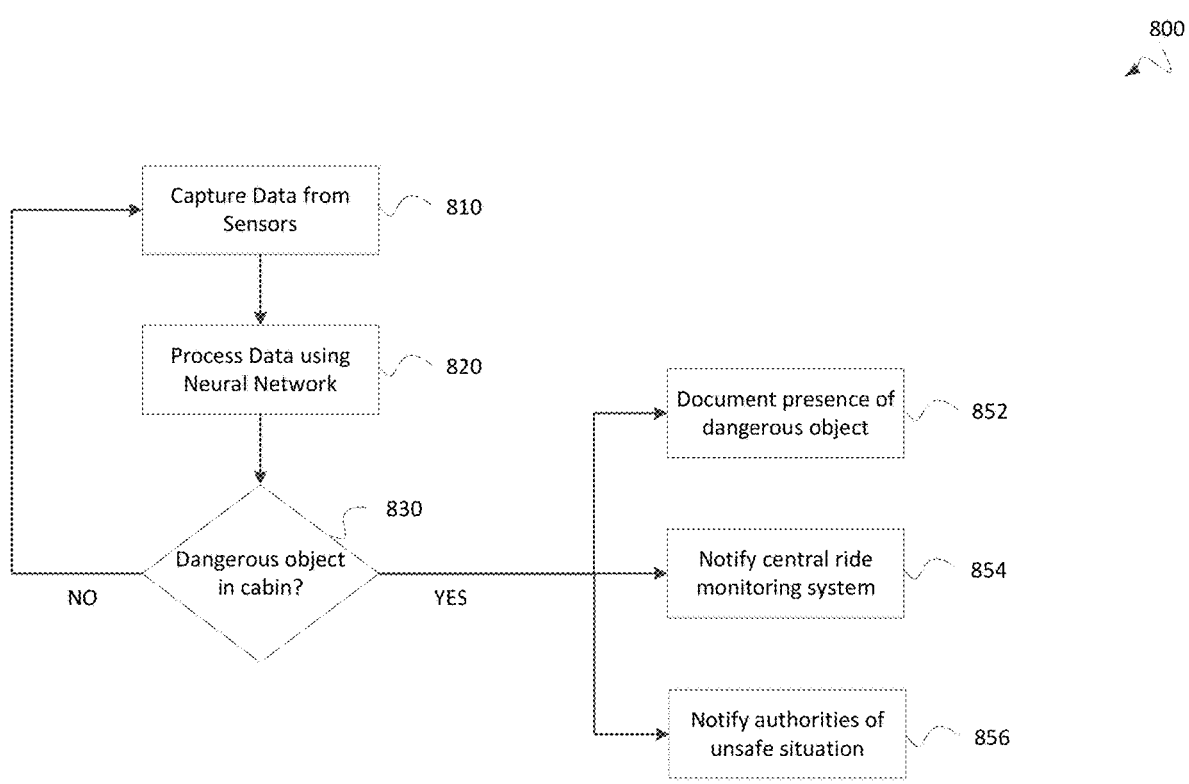
FIG. 8 is a flowchart of yet another example process for detecting an unsafe cabin condition, in accordance with embodiments of the disclosed technology.

FIG. 8 is a flowchart of yet another example process 800 for detecting an unsafe cabin condition, in accordance with embodiments of the disclosed technology.

In some embodiments, the process 800 may be advantageously applied to a vehicle that is part of a rideshare service (e.g., Uber, Lyft), a fleet vehicle, a taxicab or the like. A vehicle that is frequented my multiple passengers, who may not necessarily know each other, could be monitored for the presence of dangerous objects.

At block 810, sensor data is captured. In some embodiments, the sensor data may include images, and may further include video data, acoustic data and/or environmental data (e.g. temperature or humidity). For example, the sensors used to capture the data may include one or more cameras, a mmWave sensor or an infrared sensor, as described with respect to sensors elsewhere in the present disclosure (e.g., sensors 112, 114, 210, 211, 212, 213 and 214).

At block 820, the sensor data is processed by a neural network (e.g., 220). For example, the neural network may include one or more convolutional neural networks (CNNs) and/or recurrent neural networks (RNNs) that may be configured in different arrangements. In another example, the RNNs may include one or more long short-term memory (LSTM) units, which may be used to implement deep learning algorithms. In yet another example, the each of the one or more CNNs may be used to process data from a different type of sensor.

At block 830, a determination is made as to whether there is a dangerous object in the cabin. For example, the determination may encompass a firearm, a sharp object (e.g., a knife or box-cutter that is unsheathed) or an explosive device (e.g., fireworks). If a dangerous object is not detected, the process returns to block 810 wherein the next subsequent set of images are captured by the sensors. If a dangerous object is detected, the process continues to performing one or more responsive actions.

At block 852, the one or more responsive actions include documenting that a dangerous object is in the cabin. In some embodiments, the unsafe behavior may be documented on-board the vehicle (e.g., using memory 201). In other embodiments, the unsafe behavior may be documented off-site using the available communication unit (e.g., transceiver 207).

At block 854, the one or more responsive actions include notifying a central ride monitoring system of the presence of the dangerous object in the cabin.

At block 856, the one or more responsive actions include notifying a law enforcement authority of the presence of the dangerous object in the cabin.

Figure 9:
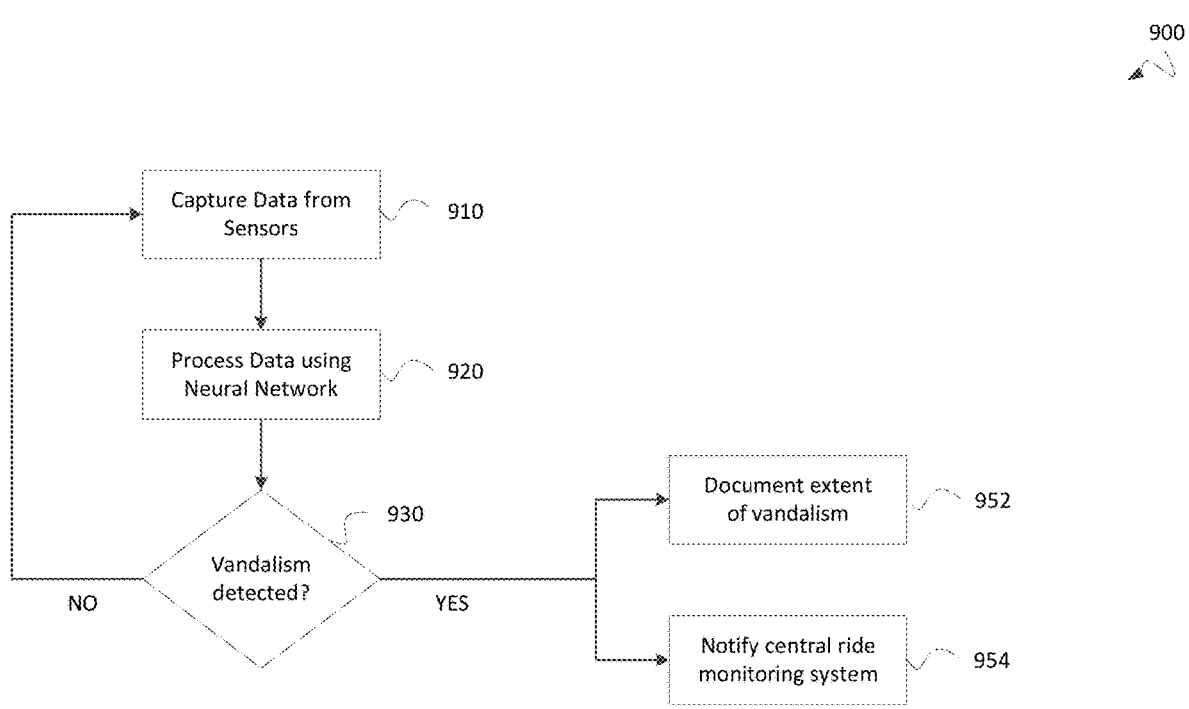
FIG. 9 is a flowchart of yet another example process for detecting an unsafe cabin condition, in accordance with embodiments of the disclosed technology.

FIG. 9 is a flowchart of yet another example process 900 for detecting an unsafe cabin condition, in accordance with embodiments of the disclosed technology.

In some embodiments, the process 900 may be advantageously applied to a vehicle that is part of a rideshare service (e.g., Uber, Lyft), a fleet vehicle, a taxicab or the like. A vehicle that is frequented my multiple passengers, who may not necessarily know each other, could be monitored for vandalism.

At block 910, sensor data is captured. In some embodiments, the sensor data may include images, and may further include video data, acoustic data and/or environmental data (e.g. temperature or humidity). For example, the sensors used to capture the data may include one or more cameras, a mmWave sensor or an infrared sensor, as described with respect to sensors elsewhere in the present disclosure (e.g., sensors 112, 114, 210, 211, 212, 213 and 214).

At block 920, the sensor data is processed by a neural network (e.g., 220). For example, the neural network may include one or more convolutional neural networks (CNNs) and/or recurrent neural networks (RNNs) that may be configured in different arrangements. In another example, the RNNs may include one or more long short-term memory (LSTM) units, which may be used to implement deep learning algorithms. In yet another example, the each of the one or more CNNs may be used to process data from a different type of sensor.

At block 930, a determination is made as to whether the cabin has been vandalized. For example, the determination may encompass tears in seat fabric, the use of spray paint, litter or food remnants at the floor of the cabin, and the like. If cabin vandalism is not detected, the process returns to block 910 wherein the next subsequent set of images are captured by the sensors. If cabin vandalism is detected, the process continues to performing one or more responsive actions.

At block 952, the one or more responsive actions include documenting the extent of the cabin vandalism. In some embodiments, the unsafe behavior may be documented on-board the vehicle (e.g., using memory 201). In other embodiments, the unsafe behavior may be documented off-site using the available communication unit (e.g., transceiver 207).

At block 954, the one or more responsive actions include notifying a central ride monitoring system of the presence of the dangerous object in the cabin.

Figure 10:
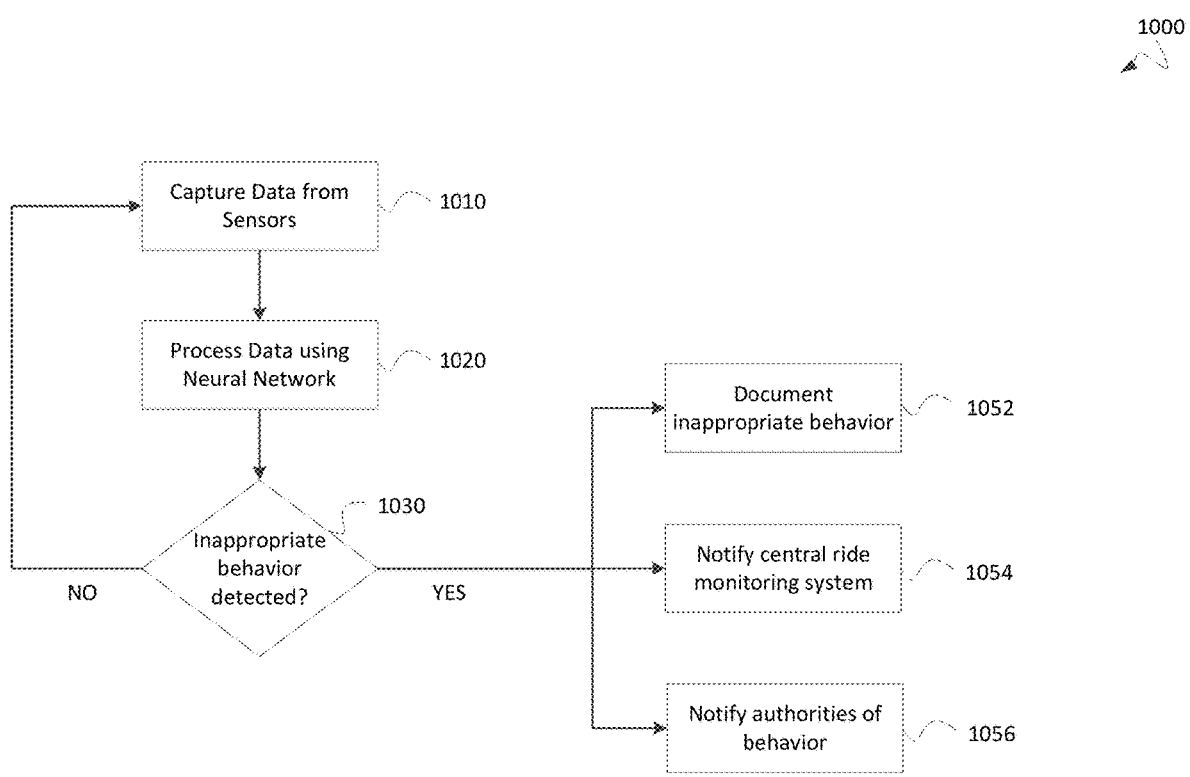
FIG. 10 is a flowchart of yet another example process for detecting an unsafe cabin condition, in accordance with embodiments of the disclosed technology.

FIG. 10 is a flowchart of yet another example process 1000 for detecting an unsafe cabin condition, in accordance with embodiments of the disclosed technology.

In some embodiments, the process 1000 may be advantageously applied to a vehicle that is part of a rideshare service (e.g., Uber, Lyft), a fleet vehicle, a taxicab or the like. A vehicle that is frequented my multiple passengers, who may not necessarily know each other, could be monitored for inappropriate behavior on the part of the passengers.

At block 1010, sensor data is captured. In some embodiments, the sensor data may include images, and may further include video data, acoustic data and/or environmental data (e.g. temperature or humidity). For example, the sensors used to capture the data may include one or more cameras, a mmWave sensor or an infrared sensor, as described with respect to sensors elsewhere in the present disclosure (e.g., sensors 112, 114, 210, 211, 212, 213 and 214).

At block 1020, the sensor data is processed by a neural network (e.g., 220). For example, the neural network may include one or more convolutional neural networks (CNNs) and/or recurrent neural networks (RNNs) that may be configured in different arrangements. In another example, the RNNs may include one or more long short-term memory (LSTM) units, which may be used to implement deep learning algorithms. In yet another example, the each of the one or more CNNs may be used to process data from a different type of sensor.

At block 1030, a determination is made as to whether inappropriate behavior has been detected. If inappropriate behavior is not detected, the process returns to block 1010 wherein the next subsequent set of images are captured by the sensors. If inappropriate behavior is detected, the process continues to performing one or more responsive actions.

At block 1052, the one or more responsive actions include documenting the inappropriate behavior. In some embodiments, the unsafe behavior may be documented on-board the vehicle (e.g., using memory 201). In other embodiments, the unsafe behavior may be documented off-site using the available communication unit (e.g., transceiver 207).

At block 1054, the one or more responsive actions include notifying a central ride monitoring system of the inappropriate behavior.

At block 1056, the one or more responsive actions include notifying a law enforcement authority of the inappropriate behavior.

Figure 11:
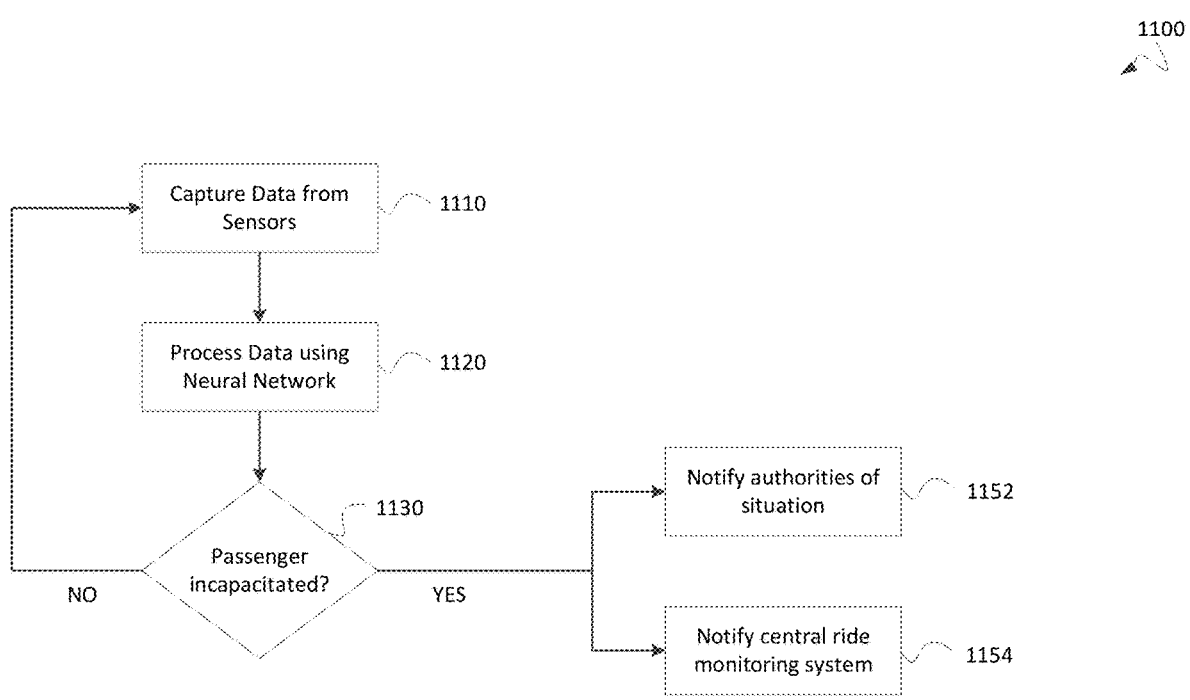
FIG. 11 is a flowchart of yet another example process for detecting an unsafe cabin condition, in accordance with embodiments of the disclosed technology.

FIG. 11 is a flowchart of yet another example process 1100 for detecting an unsafe cabin condition, in accordance with embodiments of the disclosed technology.

In some embodiments, the process 1100 may be advantageously applied to a vehicle that is part of a rideshare service (e.g., Uber, Lyft), a fleet vehicle, a taxicab or the like. A vehicle that is frequented my multiple passengers, who may not necessarily know each other, could be monitored for a passenger becoming incapacitated during the ride.

At block 1110, sensor data is captured. In some embodiments, the sensor data may include images, and may further include video data, acoustic data and/or environmental data (e.g. temperature or humidity). For example, the sensors used to capture the data may include one or more cameras, a mmWave sensor or an infrared sensor, as described with respect to sensors elsewhere in the present disclosure (e.g., sensors 112, 114, 210, 211, 212, 213 and 214).

At block 1120, the sensor data is processed by a neural network (e.g., 220). For example, the neural network may include one or more convolutional neural networks (CNNs) and/or recurrent neural networks (RNNs) that may be configured in different arrangements. In another example, the RNNs may include one or more long short-term memory (LSTM) units, which may be used to implement deep learning algorithms. In yet another example, the each of the one or more CNNs may be used to process data from a different type of sensor.

At block 1130, a determination is made as to whether a passenger is incapacitated. If an incapacitated passenger is not detected, the process returns to block 1110 wherein the next subsequent set of images are captured by the sensors. If there is an incapacitated passenger in the cabin, the process continues to performing one or more responsive actions.

At block 1152, the one or more responsive actions include notifying a law enforcement authority of the incapacitated passenger.

At block 1154, the one or more responsive actions include notifying a central ride monitoring system of the incapacitated passenger.

Figure 12:
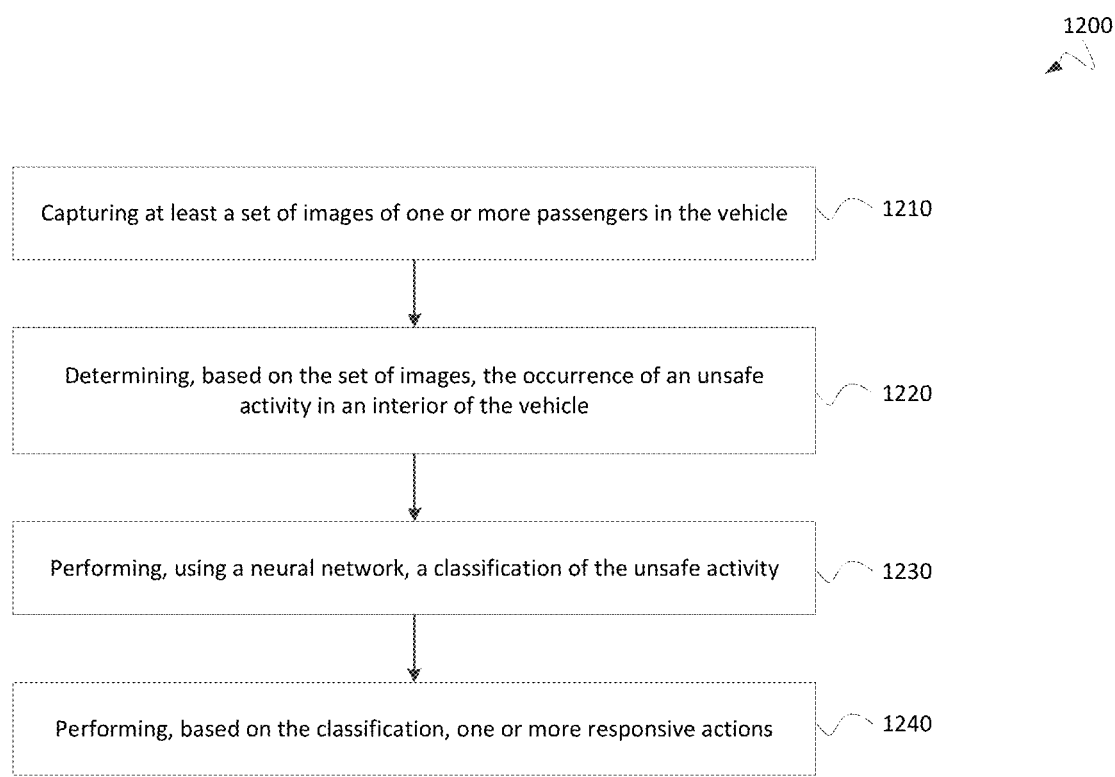
FIG. 12 shows a flowchart of an example method for using enhancing passenger safety, according to embodiments of the disclosed technology.

FIG. 12 shows a flowchart of an example method 1200 for using enhancing the safety of the passenger experience. The method 1200 includes, at step 1210, capturing at least a set of images of one or more passengers in the vehicle.

The method 1200 includes, at step 1220, determining, based on the set of images, the occurrence of an unsafe activity in a cabin of the vehicle.

In some embodiments, the unsafe activity is at least one of a protrusion of an object through a window or a door of the vehicle, an object thrown out of the window or the door of the vehicle, an unrestrained child amongst the one or more passengers, a presence of a dangerous object in the cabin of the vehicle, vandalism of the cabin of the vehicle, inappropriate behavior by at least one of the one or more passengers, or an incapacitated passenger.

In some embodiments, the one or more responsive actions comprises at least one of documenting the unsafe activity, notifying a central ride monitoring system, or notifying a law enforcement authority of the unsafe activity.

The method 1200 includes, at step 1230, performing, using a neural network, a classification of the unsafe activity.

In some embodiments, the unsafe activity is one of a predetermined number of unsafe activities. In other embodiments, the method 1200 further includes the step of training, prior to performing the classification, the neural network based on a plurality of images depicting each of the predetermined number of unsafe activities.

The method 1200 includes, at step 1240, performing, based on the classification, one or more responsive actions.

In some embodiments, the set of images is captured using at least one camera with depth-sensing capabilities.

In some embodiments, the unsafe activity is a protrusion of an object through a window or a door of the vehicle, and the one or more responsive actions comprises at least one of warning the one or more passengers, documenting the unsafe activity, increasing a distance between the vehicle and one or more proximate vehicles, or stopping the vehicle if the unsafe activity cannot be mitigated.

In some embodiments, the unsafe activity is an object thrown out of a window or a door of the vehicle, and the one or more responsive actions comprises at least one of warning the one or more passengers, documenting the unsafe activity, or stopping the vehicle if the object is of critical value.

In some embodiments, the unsafe activity is an unrestrained child amongst the one or more passengers, and the one or more responsive actions comprises documenting the unsafe activity or ensuring that the vehicle does not start until the unsafe activity is mitigated.

In some embodiments, the unsafe activity is a presence of a dangerous object in a cabin of the vehicle, and the one or more responsive actions comprises at least one of documenting the unsafe activity, notifying a central ride monitoring system, or notifying authorities of the presence of the dangerous object.

In some embodiments, the unsafe activity comprises vandalism of a cabin of the vehicle, and the one or more response actions comprises documenting the unsafe activity or notifying a central ride monitoring system.

In some embodiments, the unsafe activity comprises inappropriate behavior by at least one of the one or more passengers, and the one or more response actions comprises at least one of documenting the unsafe activity, notifying a central ride monitoring system, or notifying authorities of the presence of the inappropriate behavior.

In some embodiments, the unsafe activity comprises an incapacitated passenger, and wherein the one or more response actions comprises notifying a central ride monitoring system or notifying authorities of the presence of the incapacitated passenger.

As described above, embodiments of the disclosed technology may be used for the detection of unsafe cabin conditions. In some embodiments, the systems disclosed in the present document (e.g., 200 in FIGS. 2A and 2B) may be implemented in a particular vehicle, and configured to detect a subset of the unsafe cabin behaviors (or conditions), and then reconfigured if the vehicle is repurposed. For example, if a personal vehicle were to be used as part of a rideshare program, the software could be updated to now enable the detection of vandalism and dangerous objects, and no modifications to the hardware would be required. In another example, the software updates may be received on-demand and wirelessly (e.g., using transceiver 207).

In some embodiments, the software update may be performed automatically as a function of the location of the vehicle. For example, if the on-board GPS indicates that the vehicle is heading toward the airport, the detection of dangerous objects may be enabled for that particular ride. In another example, the detection of an incapacitated passenger may be activated if the vehicle is heading toward or leaving a hospital.

In some embodiments, the software update may be performed automatically based on what is observed by the sensors (e.g., 112, 114, 210, 211, 212, 213 and 214). For example, the detection of an unrestrained child may be enabled if the sensor system identifies a child entering the vehicle. In another example, the detection of cabin vandalism may be activated if passengers carrying cans of spray paint or open food containers are identified.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A system for enhancing passenger safety in a vehicle, comprising:
    a processor; and
    an internal sensor system, coupled to the processor, configured to capture at least a set of images of one or more passengers in the vehicle,
    wherein the processor is configured to:
        determine, based on the set of images, the occurrence of an unsafe activity,
        perform, using a neural network, a classification of the unsafe activity, and
        perform, based on the classification, one or more responsive actions.

2. The system of claim 1, wherein the unsafe activity is a protrusion of an object through a window or a door of the vehicle, and wherein the one or more responsive actions comprises at least one of warning the one or more passengers, documenting the unsafe activity, increasing a distance between the vehicle and one or more proximate vehicles, or stopping the vehicle if the unsafe activity cannot be mitigated.

3. The system of claim 1, wherein the unsafe activity is an object thrown out of a window or a door of the vehicle, and wherein the one or more responsive actions comprises at least one of warning the one or more passengers, documenting the unsafe activity, or stopping the vehicle if the object is of critical value.

4. The system of claim 1, wherein the unsafe activity is an unrestrained child amongst the one or more passengers, and wherein the one or more responsive actions comprises documenting the unsafe activity or ensuring that the vehicle does not start until the unsafe activity is mitigated.

5. The system of claim 1, wherein the unsafe activity is a presence of a dangerous object in a cabin of the vehicle, and wherein the one or more responsive actions comprises at least one of documenting the unsafe activity, notifying a central ride monitoring system, or notifying authorities of the presence of the dangerous object.

6. The system of claim 1, wherein the unsafe activity comprises vandalism of a cabin of the vehicle, and wherein the one or more response actions comprises documenting the unsafe activity or notifying a central ride monitoring system.

7. The system of claim 1, wherein the unsafe activity comprises inappropriate behavior by at least one of the one or more passengers, and wherein the one or more response actions comprises at least one of documenting the unsafe activity, notifying a central ride monitoring system, or notifying authorities of the presence of the inappropriate behavior.

8. The system of claim 1, wherein the unsafe activity comprises an incapacitated passenger, and wherein the one or more response actions comprises notifying a central ride monitoring system or notifying authorities of the presence of the incapacitated passenger.

9. The system of any of claim 1, wherein the internal sensor system comprises one or more cameras, a millimeter wave sensor or an infrared sensor.

10. A method for enhancing passenger safety in a vehicle, comprising:
   capturing at least a set of images of one or more passengers in the vehicle;
   determining, based on the set of images, the occurrence of an unsafe activity in a cabin of the vehicle;
   performing, using a neural network, a classification of the unsafe activity, wherein the unsafe activity is one of a predetermined number of unsafe activities; and
   performing, based on the classification, one or more responsive actions.

11. The method of claim 10, further comprising:
   training, prior to performing the classification, the neural network based on a plurality of images depicting each of the predetermined number of unsafe activities.

12. The method of claim 10, wherein the set of images is captured using at least one camera with depth-sensing capabilities.

13. The method of claim 10, wherein the unsafe activity is at least one of a protrusion of an object through a window or a door of the vehicle, an object thrown out of the window or the door of the vehicle, an unrestrained child amongst the one or more passengers, a presence of a dangerous object in the cabin of the vehicle, vandalism of the cabin of the vehicle, inappropriate behavior by at least one of the one or more passengers, or an incapacitated passenger.

14. The method of claim 13, wherein the one or more responsive actions comprises at least one of documenting the unsafe activity, notifying a central ride monitoring system, or notifying a law enforcement authority of the unsafe activity.

* * * * *